(12) United States Patent
McClurg

(10) Patent No.: US 7,747,046 B2
(45) Date of Patent: Jun. 29, 2010

(54) APPARATUS AND METHOD FOR OBTAINING IMAGES USING A PRISM

(75) Inventor: George W. McClurg, Jensen Beach, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 1044 days.

(21) Appl. No.: 11/450,893

(22) Filed: Jun. 12, 2006

(65) Prior Publication Data

US 2006/0291704 A1 Dec. 28, 2006

Related U.S. Application Data

(60) Provisional application No. 60/689,350, filed on Jun. 10, 2005.

(51) Int. Cl.
*G06K 9/00* (2006.01)

(52) U.S. Cl. .................................................. 382/124

(58) Field of Classification Search ......... 382/124–127, 382/312; 356/71, 136
See application file for complete search history.

(56) References Cited

U.S. PATENT DOCUMENTS

| | | | |
|---|---|---|---|
| 3,887,791 A | | 6/1975 | Kitchens |
| 4,083,635 A | * | 4/1978 | Reed, Jr. .................. 355/77 |
| 4,428,670 A | | 1/1984 | Ruell et al. |
| 4,781,452 A | | 11/1988 | Ace |
| 5,222,153 A | * | 6/1993 | Beiswenger ............. 382/127 |
| 5,359,207 A | | 10/1994 | Turner |
| 5,619,586 A | | 4/1997 | Sibbald |
| 5,623,553 A | * | 4/1997 | Sekiya .................... 382/127 |
| 5,737,071 A | * | 4/1998 | Arndt ..................... 356/71 |
| 6,141,147 A | | 10/2000 | Wixey et al. |
| 6,178,255 B1 | | 1/2001 | Scott et al. |
| 6,191,410 B1 | | 2/2001 | Johnson |
| 6,195,448 B1 | * | 2/2001 | Schiller .................. 382/126 |
| 6,414,749 B1 | | 7/2002 | Okamoto et al. |
| 6,867,850 B2 | | 3/2005 | McClurg et al. |
| 6,954,260 B2 | | 10/2005 | Arnold et al. |
| 6,954,261 B2 | | 10/2005 | McClurg |
| 2002/0018584 A1 | | 2/2002 | Johnson |
| 2003/0025897 A1 | | 2/2003 | Iwai |
| 2003/0086625 A1 | | 5/2003 | Hamid |
| 2003/0090817 A1 | | 5/2003 | Nolan |

FOREIGN PATENT DOCUMENTS

| | | |
|---|---|---|
| EP | 0 272 820 | 6/1988 |
| JP | 3-11313 | 1/1991 |
| JP | 5-307198 | 11/1993 |

OTHER PUBLICATIONS

English-language abstract for: Junichi, Ito, JP 3-11313 (listed on accompanying PTO/SB/08A as document FP2).
English-language abstract for: Harvey et al., JP 5-307198 (listed on accompanying PTO/Sb/08A as document FP3).

\* cited by examiner

*Primary Examiner*—Daniel G Mariam
(74) *Attorney, Agent, or Firm*—Sterne, Kessler, Goldstein & Fox P.L.L.C.

(57) ABSTRACT

An improved apparatus and method for obtaining images through a prism are provided. In an embodiment, a thin fingerprint prism wedge, with a geometry designed to minimize foreshortening and maximize contrast, is provided in an optical path between an optical sensor and an object to be imaged. In some embodiments, the apparatus operates on the principle of internal surface reflections instead of total internal reflection (TIR).

20 Claims, 18 Drawing Sheets

- Curved prism shape

- Cone design

*Cross section of the cone*

APPARATUS AND METHOD FOR OBTAINING IMAGES USING A PRISM

CROSS-REFERENCE TO RELATED APPLICATIONS

This application claims the benefit of U.S. Provisional Application Ser. No. 60/689,350, filed Jun. 10, 2005, incorporated herein by reference in its entirety.

FIELD OF THE INVENTION

The present invention relates generally to the field of obtaining images through an optical path including a prism or an element providing a similar function.

BACKGROUND

Biometrics is the science and technology of authentication (i.e. establishing the identity of an individual) by measuring the person's physiological or behavioral features. The term is derived from the Greek words "bios" for life and "metron" for degree.

In information technology, biometrics usually refers to technologies for measuring and analyzing human physiological characteristics such as fingerprints, eye retinas and irises, voice patterns, facial patterns, and hand measurements; especially for authentication purposes.

In a typical biometric system, a person registers with the system when one or more of their physiological characteristics are obtained, processed by a numerical algorithm, and entered into a database. Ideally, when the person logs into the system at a later time all of their features match. If someone else tries to log in as the same person, their biometric information does not fully match, so the system will not allow them to log in.

Performance of a biometric system is usually referred to in terms of the false accept rate (FAR), the false non-match or reject rate (FRR), and the failure to enroll rate (FTE or FER). In real-world biometric systems the FAR and FRR can typically be traded off against each other by changing parameters. One of the most common measures of real-world biometric systems is the rate at the setting at which both accept and reject errors are equal: the equal error rate (EER), also known as the cross-over error rate (CER). The lower the EER or CER, the more accurate the system is considered to be. Current technologies have widely varying Equal Error Rates (EER) from as low as 60% to as high as 99.9%.

Among all the biometric techniques, fingerprint-based identification is one of the oldest and most accurate methods which has been successfully used in numerous applications. Everyone is known to have unique, immutable fingerprints. A fingerprint is made of a series of ridges and furrows on the surface of the finger. The uniqueness of a fingerprint can be determined by the pattern of ridges and furrows as well as the minutiae points. Minutiae points are local ridge characteristics that occur at either a ridge bifurcation or a ridge ending. To implement fingerprint-based identification, an image or imprint of the fingerprint has to be acquired.

Similarly, an image of any uniquely identifiable skin surface can be used for identification. In addition to a single fingerprint, multiple fingertip images can be used for this purpose. In addition, images of the palm or the entire hand can be used as biometric identifiers.

In each of these identifying methods, a scanning process is used to acquire data representing a person's skin pattern characteristics. This allows the recognition of a person through quantifiable physiological characteristics that verify the identity of an individual. Optical methods are often used to obtain a visual image of the surface data of interest. In the case of fingerprint identification, a common optical data capture method includes placing one or more fingertips on a translucent platen. Beneath the platen, light reflected from the fingertips is directed through an optical path to an imaging device that captures image data.

Fingerprint scanners are available with image sensors that capture an image of a fingerprint. A signal representative of the captured image is then used for further processing. For example, the data may be used for one-to-one or one-to-many fingerprint matching. Many fingerprint scanners use a wedge-shaped prism in the optical path of the scanner. For example, U.S. Pat. No. 6,178,255, commonly owned with the present application, discloses a fingerprint scanner that uses a prism element to selectively collect roll prints or single or multiple-finger flat prints.

However, the inventor has found that traditional use of total internal reflection in a standard wedge shaped prism to capture a fingerprint or any other image results in foreshortening of the desired image. There is a need for an improved prism design to capture fingerprints that overcomes foreshortening effects.

SUMMARY OF THE INVENTION

An improved apparatus and method for obtaining images through a prism is provided. In an embodiment, a thin fingerprint prism wedge, with a geometry designed to minimize foreshortening and maximize contrast is provided in an optical path between an optical sensor and an object to be imaged. In some embodiments, the apparatus operates on the principle of internal surface reflections instead of total internal reflection (TIR).

Additional features and advantages of the invention will be set forth in the description which follows, and in part will be apparent from the description, or may be learned by practice of the invention. This Summary of the Invention is provided for convenience and is not intended to limit the scope of the invention, which is defined by the language of the claims.

It is to be understood that both the foregoing general description and the following detailed description are exemplary and explanatory and are intended to provide further explanation of the invention as claimed. Neither the summary nor the detailed description is intended to limit the scope of the claims in any way.

BRIEF SUMMARY OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

Figure 1:
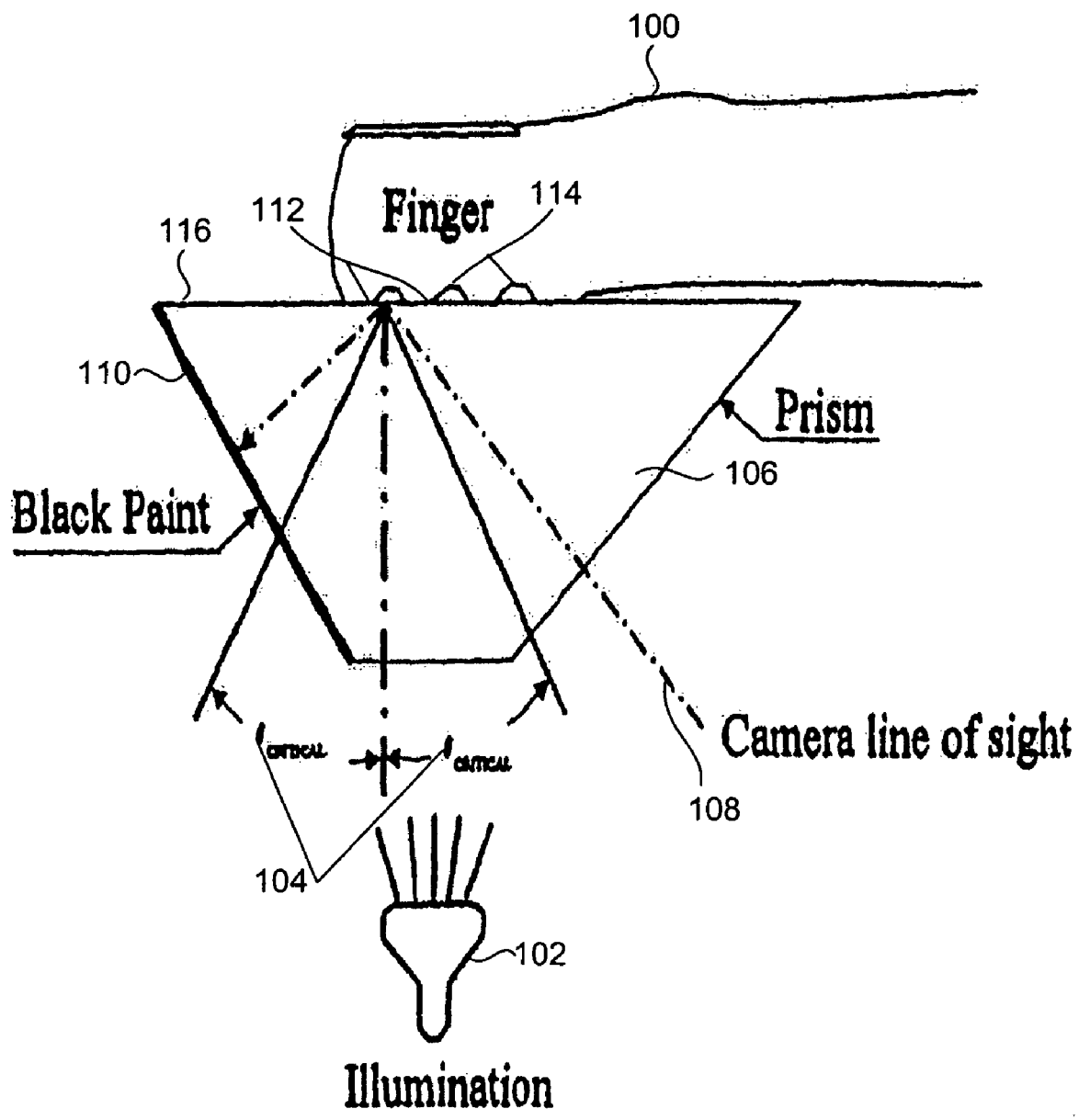
FIG. 1 is a partial side sectional view of a fingerprint scanner.

The present invention will now be described with reference to the accompanying drawings. In the drawings, some like reference numbers indicate identical or functionally similar elements. Additionally, the left-most digit(s) of most reference numbers identify the drawing in which the reference numbers first appear.

DETAILED DESCRIPTION OF THE PREFERRED EMBODIMENTS

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

This specification discloses one or more embodiments that incorporate the features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the present invention provide, among other things, improved apparatus and methods for substantially eliminating the effects of ambient light (indoor or outdoor) on a fingerprint image. Exemplary embodiments will now be described in detail with reference to the drawings.

Terminology

To more clearly delineate the present invention, an effort is made throughout the specification to adhere to the following term definitions consistently.

The term "finger" refers to any digit on a hand including, but not limited to, a thumb, an index finger, middle finger, ring finger, or a pinky finger.

The term "skin surface" includes but is not limited to the surface of one or more fingers, palms, toes, foot, hand, palm etc.

The term "print" can be any type of print including, but not limited to, a print of all or part of one or more fingers, palms, toes, foot, hand, etc. A print can also be a rolled print, a flat print, or a slap print.

The term "hand print," can include any region on a hand having a print pattern, including thenar and hypothenar regions of the palm, interdigital regions, palm heel, palm pocket, writer's palm, and/or fingertips.

The term "live scan" refers to a capture of any type of print image made by a print scanner.

The term "non-planar prism" includes a prism having a non-planar platen surface that extends around all or part of an axis of the prism, and whose non-planar platen surface allows for total internal reflection of light. A non-planar platen surface allows a print pattern (such as, a print pattern on a hand, a palm pocket, a writer's palm, a writer's palm with fingertips), or other hand characteristic images, to be captured. An example of this type of prism can be an approximately conically-shaped prism. Other examples can be approximately spherically shaped prisms, curved prisms, and the like.

A platen can be movable or stationary depending upon the particular type of scanner and the type of print being captured by the scanner.

The terms "fingerprint scanner", "scanner", "live scanner", "live print scanner," and "print scanner" are interchangeable, and refer to any type of scanner which can obtain an image of a print pattern on all or part of one or more fingers, palms, toes, feet, hands, etc. in a live scan. The obtained images can be combined in any format including, but not limited to, an FBI, state, or international ten print format.

"Camera/image sensor optical axis", "camera/image sensor line of sight", "optical path" and "optical axis" are used interchangeably and refer to an axis or axes along which any desired image sensing device may be positioned to capture an image. In embodiments, the optical path may also be used to indirectly focus the desired image onto the image sensing device using an optical sub-system.

Example Fingerprint Scanning Systems

FIG. 1 is a partial side sectional view of a fingerprint scanner. It has a prism 106, illumination source 102 and optional black paint on non-platen surface 110 of prism 106 and a platen surface 116 against which finger 100 is placed. Illumination source 102 emits light within critical angle 104 that passes through prism 106, is reflected by the internal surface of platen side 116 of prism 106 and is imaged by an image sensor or camera positioned along the camera line of sight, optical path 108. Platen surface 116 can be a surface of prism 300 as shown or alternatively platen surface 116 can be a surface of a thin transparent material, such as a sheet of silicone rubber, placed on the prism. To achieve total internal reflection (TIR), optical path 108 is positioned outside the critical angle 104. In some cases an optical sub-system might be employed to create optical path 108 between the internal surface of platen 116 and the camera if the camera cannot be positioned along optical path 108. Finger 100 has fingerprint ridges 112 that contact platen surface 116 and fingerprint valleys 114 that have an air gap with platen surface 116. The black paint on non-platen surface 110 may be used to avoid auxiliary reflections from non-platen surface 110.

Figure 2:
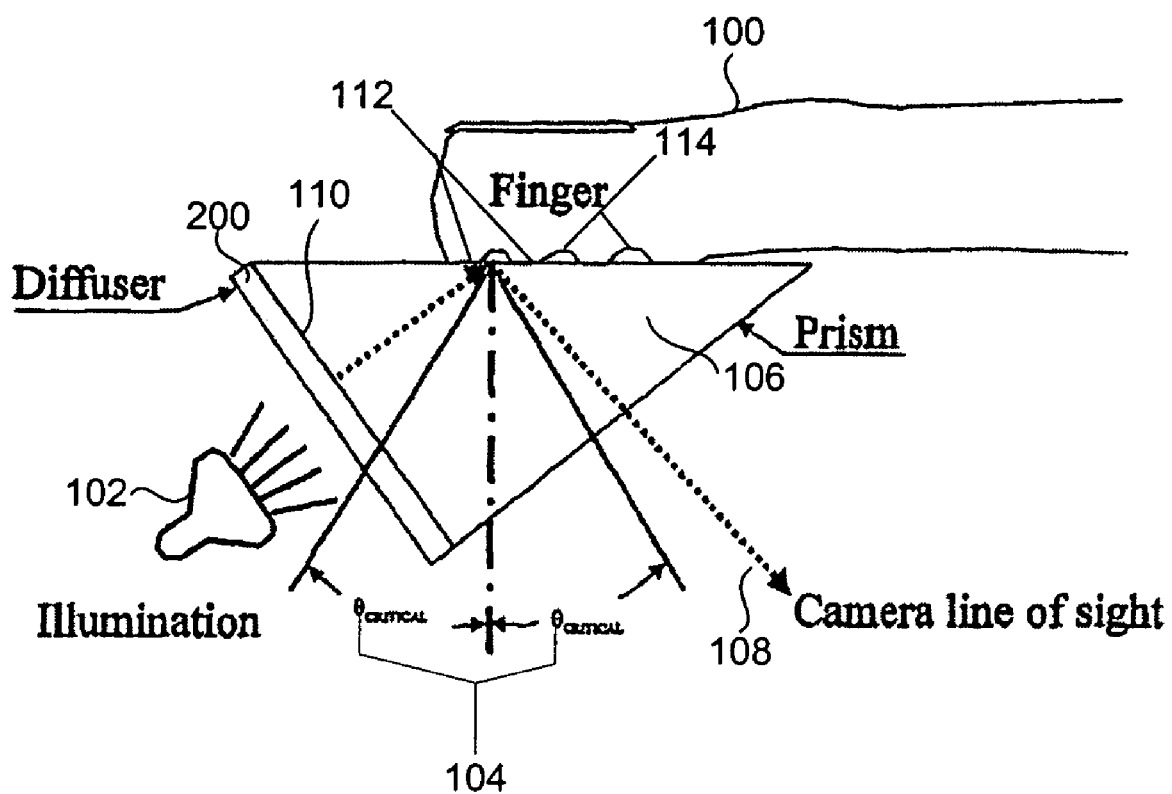
FIG. 2 is a partial side sectional view of another fingerprint scanner.

FIG. 2 is a partial side sectional view of another fingerprint scanner with an alternate illumination source 102 arrangement and a diffuser 200 on non-platen surface 110. In this example both the optical path 108 and the illumination source 102 are outside the critical angle 104. The use of diffuser 200 obviates the need for black paint on non-platen surface 110.

Optical fingerprint scanners with configurations shown in FIG. 1 and FIG. 2 and other similar configurations rely on total internal reflection (TIR) to generate a high contrast fingerprint image. TIR is an optical phenomenon. When light crosses media with different refractive indices, the light beam will be bent at the boundary between the two media. At a certain angle of incidence known as the critical angle 104, light will stop crossing the boundary but instead reflect back internally at the boundary surface. For example, if the right conditions exist, TIR will occur when passing from glass to air, but will not occur when passing from air to glass. The fingerprint scanners in FIG. 1 and FIG. 2 uses prism 106 to achieve the effects of TIR. The prism 106 can be used to refract light, reflect it, or to disperse it into its constituent spectral colors and is traditionally built in the shape of a right prism with triangular base. The angle that a beam of light makes with the interface between the prism 106 and air, as well as the refractive indices of the two media determine whether it is reflected or refracted or undergoes TIR. Conventionally, the optical path 108 is positioned at an angle greater than the critical angle 104 of the prism 106 to obtain a high contrast image by means of TIR. In such scanners as shown in FIG. 1 and FIG. 2, the optical path 108 is not perpendicular to the platen surface 116, and significant foreshortening of the fingerprint image occurs. Foreshortening refers to the visual effect where an object or a distance appears shorter than it actually is because it is angled towards the camera or viewer.

Figure 3:
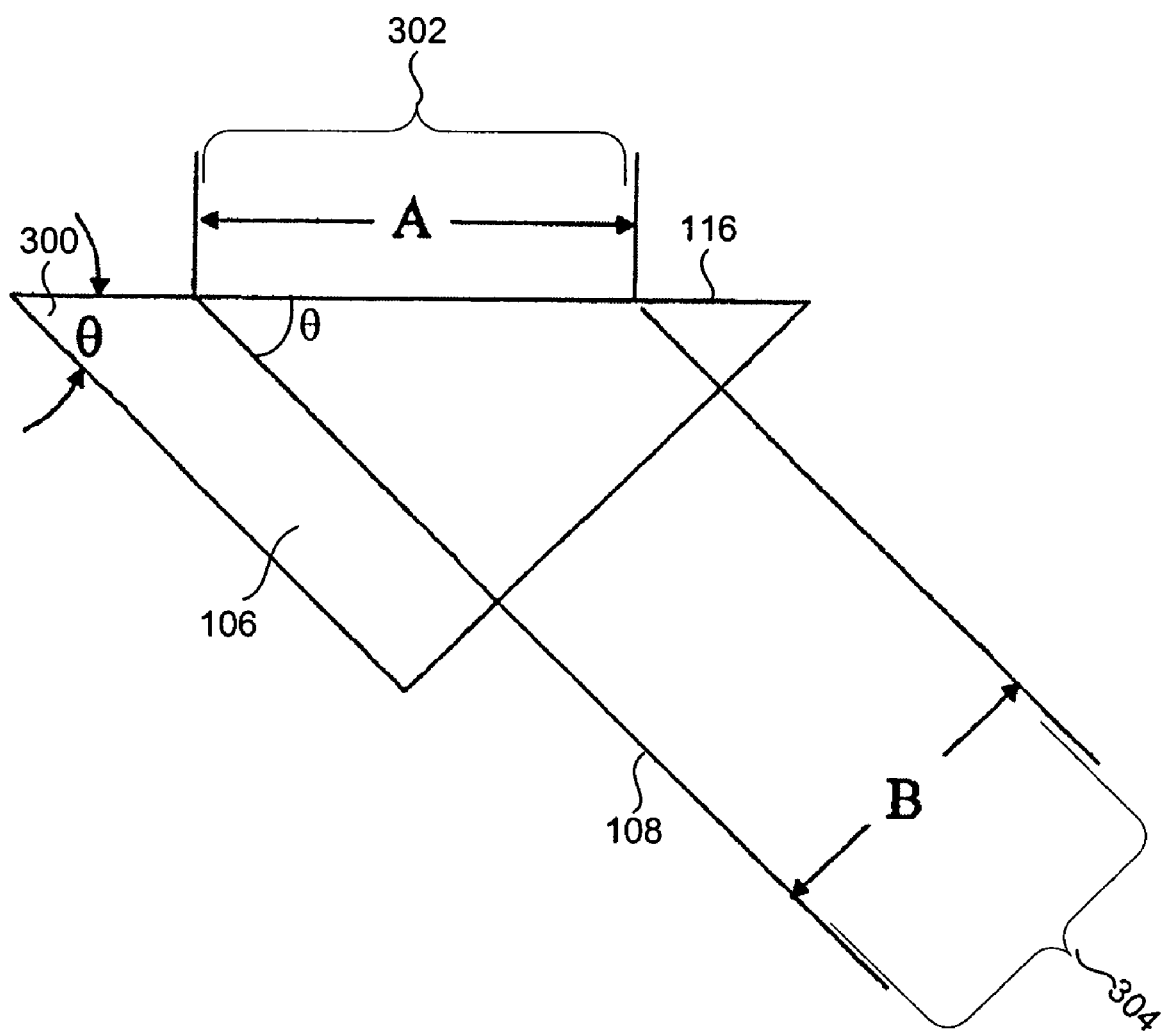
FIGS. 3, 4 and 5 illustrate examples of foreshortening.

FIG. 3 illustrates an example of foreshortening. The optical path 108 is at a 45 degree angle with respect to fingerprint platen 116 which is same as the prism angle 300. An image B 304 along the optical path will be foreshortened to approximately 70.7% of the original size of the imaged object A 302. The extent of foreshortening is determined by the equation:

$$B = A \sin(\theta) = A \sin(45) = 70.7\% A$$

Figure 4:
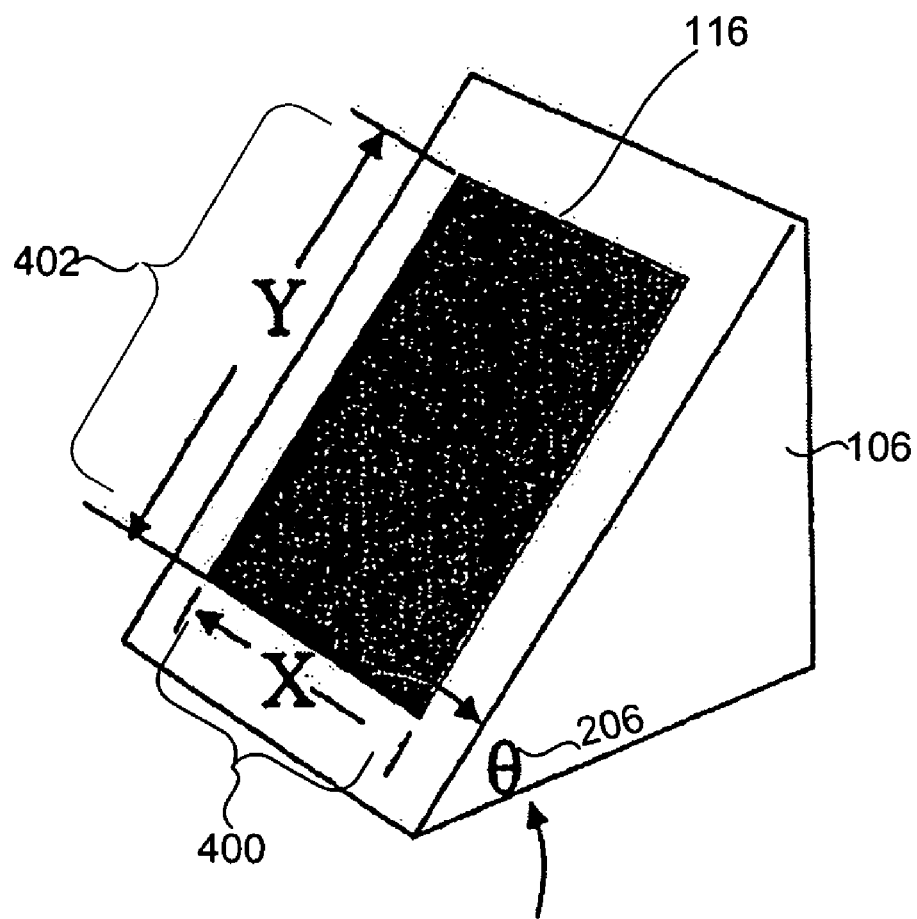
Figure 5:
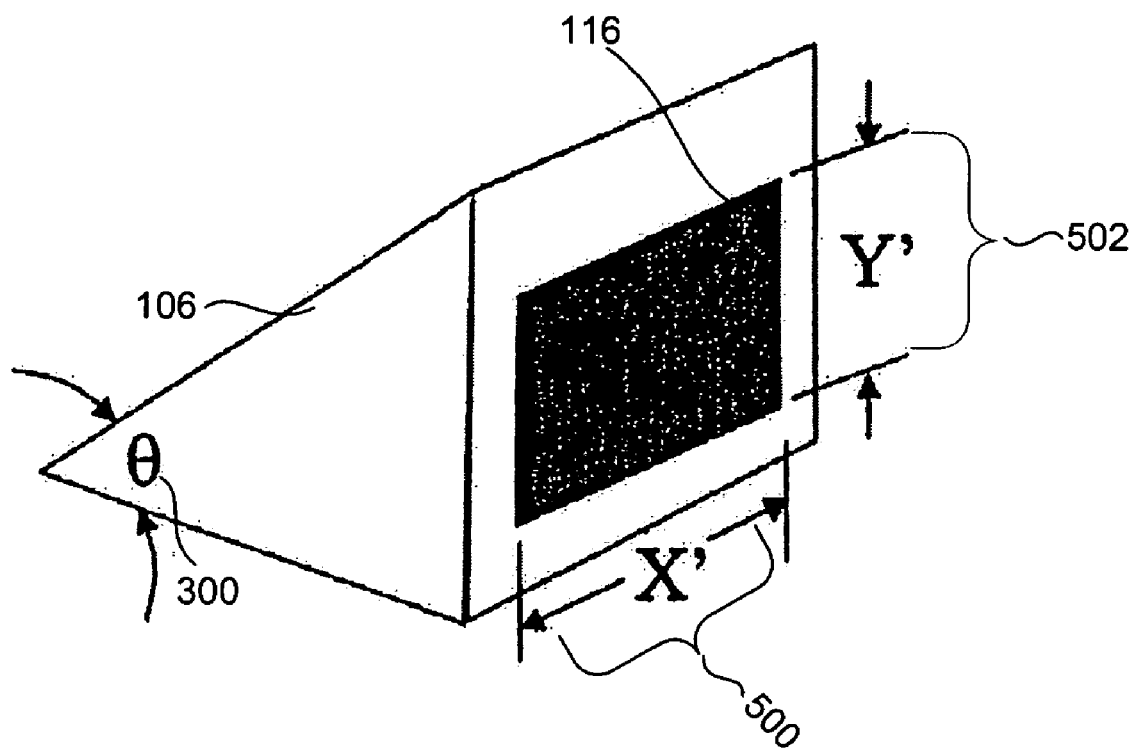

FIG. 4 and FIG. 5 illustrate how a platen surface 116 of width X 400 and length Y 402 will have a foreshortened image with width X' 500 and length Y' 502 where X' 500 has the same dimension as X 400 but Y 402 is foreshortened to Y' 502. Again the foreshortening occurs because the optical axis is not perpendicular to the platen surface 116.

There are two methods to compensate for the optical foreshortening of an image. One is the use of a cylindrical lens. The cylindrical lens would only have an optical magnification along the Y' 502 axis and not in the X' 500 axis thereby compensating for the foreshortening along the Y 402 axis. The other method is to use software to digitally resample the image. Although both methods work, they require extra steps in either manufacturing or software image processing. Either of these remedies result in additional costs and special design considerations to overcome the drawbacks of foreshortening.

Example Embodiments

The inventor has determined that foreshortening of an image can be overcome by using internal surface reflection instead of total internal reflection (TIR) by designing a thin wedge prism that allows the optical path to be perpendicular to a platen surface and at the same time maintain sufficient contrast.

In an embodiment, the apparatus takes advantage of the internal reflection properties of a prism at angles less than the critical angle for TIR. By changing the position of the light source, different aspects of the platen surface 116 can be viewed while minimizing foreshortening.

Figure 6:
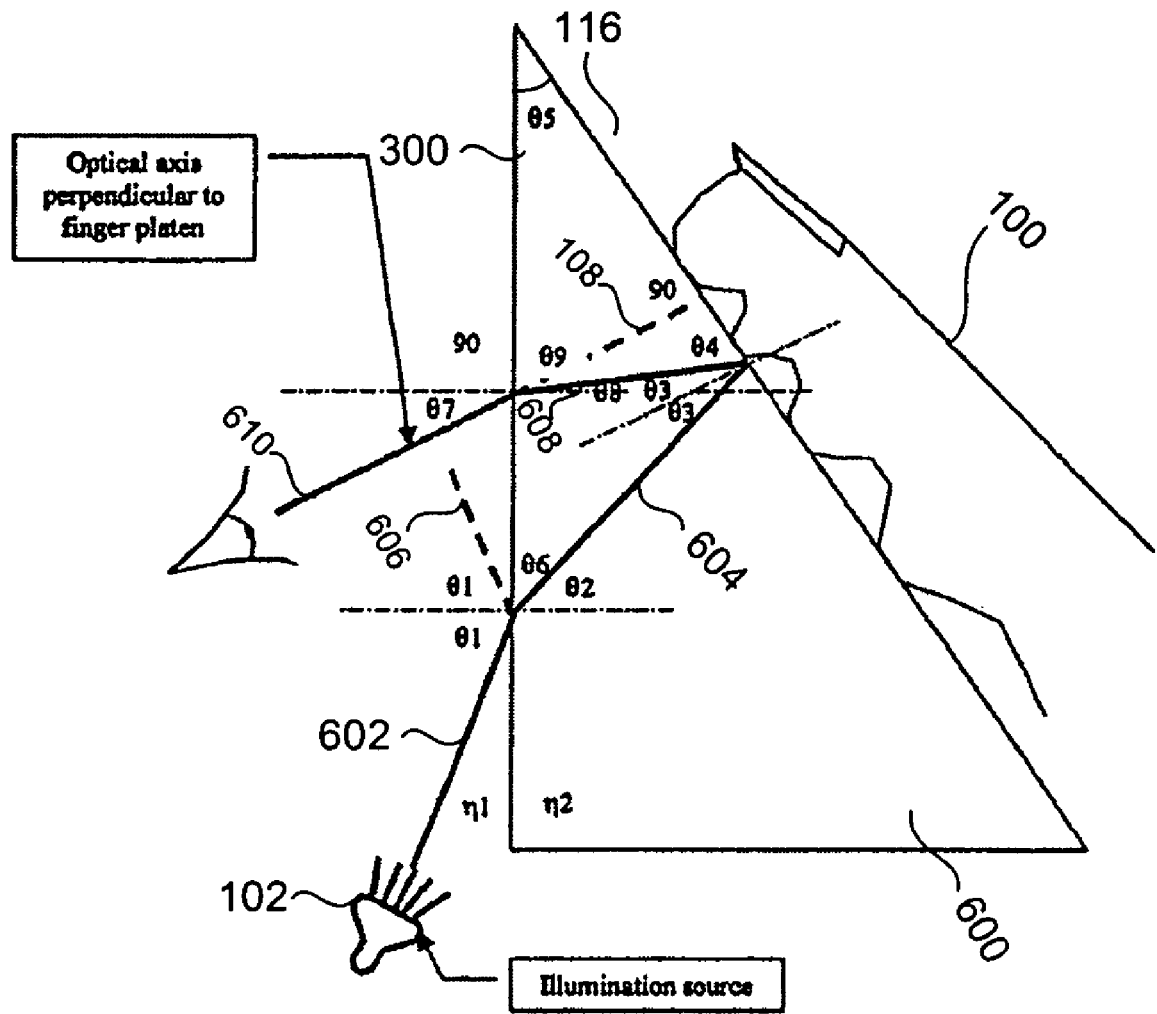
FIG. 6 illustrates a preferred embodiment.

FIG. 6 illustrates a preferred embodiment employing a thin wedge prism that allows an optical path 108 to be perpendicular to platen surface 116 thereby minimizing the effects of foreshortening. The smaller prism angle 300 of thin wedge prism 600 also minimizes image foreshortening. The prism 600 is designed to operate inside the critical angle 104 and still have sufficient contrast between the fingerprint ridges 112 and valleys 114.

FIG. 6 also shows the path of an incident light ray 602 as it enters and exits the prism 600. The angles $\theta_1$ to $\theta_4$ and $\theta_6$ to $\theta_9$ are the angles made by incident light ray 602 from illumination source 102 with the external and internal surfaces of prism 600. $\theta_3$ is the critical angle and $\theta_5$ is the prism angle 300. The incident ray 602 refracts into a primary refracted ray 604 and primary reflected ray 606. The primary refracted ray 604 reflects off the internal surface of platen 116 to create the secondary reflected ray 608 (the transmitted ray at platen surface 116 is dissipated and is not shown) which further creates a secondary refracted ray 610 (the reflected ray is not shown) along optical path 108. Equations 1-12 below solve for $\theta_1$ (the angle of incidence for incident ray 602) in terms of the prism angle 300 $\theta_5$ while maintaining the optical path 108 perpendicular to the fingerprint platen surface 116 such that $\theta_7 = \theta_5$:

1. $\theta_5 = \theta_7$ (as required)
2. $\eta_1 \sin\theta_7 = \eta_2 \cos\theta_9$ (where $\eta_1$ is the refractive index for air and $\eta_2$ is the refractive index for the material of the prism 600)

3. $\theta_9 = \cos^{-1}\left(\frac{\eta_1}{\eta_2}\sin\theta_7\right) \Rightarrow \theta_9 = \cos^{-1}\left(\frac{\eta_1}{\eta_2}\sin\theta_5\right)$ [1 & 2]

4. $\theta_5 + \theta_4 + \theta_9 = 180 \Rightarrow \theta_4 = 180 - \theta_9 - \theta_5$ 5. $\theta_5 + \theta_4 + 2\theta_3 + \theta_6 = 180 \Rightarrow \theta_6 = 180 - \theta_5 - \theta_4 - 2\theta_3$ 6. $\eta_1 \sin\theta_1 = \eta_2 \cos\theta_6 \Rightarrow \theta_1 = \sin^{-1}\left(\frac{\eta_2}{\eta_1}\cos\theta_6\right)$ 7. $\theta_4 + \theta_3 = 90 \Rightarrow \theta_4 = 90 - \theta_3$ 8. $\theta_6 = 180 - \theta_5 - 90 + \theta_3 - 2\theta_3 \Rightarrow \theta_6 = 90 - \theta_5 - \theta_3$ [5 & 7]

9. $\theta_4 =$ $180 - \theta_9 - \theta_5 \Rightarrow 90 - \theta_3 = 180 - \theta_3 - \theta_5 \Rightarrow \theta_3 = \theta_5 + \theta_9 - 90$ [7]

10. $\theta_6 = 90 - \theta_5 - \theta_5 - \theta_9 + 90 = 180 - 2\theta_5 - \theta_9$ [9 & 8]

11. $\theta_6 = 180 - 2\theta_5 - \cos^{-1}\left(\frac{\eta_2}{\eta_1}\sin\theta_5\right)$ [3 & 10]

12. $\theta_1 = \sin^{-1}\left(\frac{\eta_2}{\eta_1}\cos\left(180 - 2\theta_5 - \cos^{-1}\left(\frac{\eta_1}{\eta_2}\sin\theta_5\right)\right)\right)$ [11 & 6]

In an embodiment, the prism 600 is designed so that the primary reflected ray 606 is not in line with the optical path 108 and therefore will not make its way into the camera or image sensor.

For a given material such as acrylic, with an index of refraction of 1.5, the theoretical limits for prism angle 300 $\theta_5$ are between 0° to 30.92233°. Table 1 shows a number of solutions for the described thin wedge prism. An acrylic prism 600 with a prism angle 300 of 15° with acrylic only has 2.3% of foreshortening.

TABLE 1

Prism angle, critical angle and angles of reflected and refracted light.

| Index | | Angle (in degree) | | | | | | | | | | Material |
|---|---|---|---|---|---|---|---|---|---|---|---|---|
| $\eta_1$ | $\eta_2$ | $\theta_1$ | $\theta_2$ | $\theta_3$ | $\theta_{3crit}$ | $\theta_4$ | $\theta_5$ | $\theta_6$ | $\theta_7$ | $\theta_8$ | $\theta_9$ | Material |
| 1 | 1.5 | 0.0 | 0.0 | 0.0 | 41.8 | 90.0 | 0 | 90.0 | 0.0 | 0.0 | 90.0 | Acrylic |
| 1 | 1.5 | 10.0 | 6.7 | 1.7 | 41.8 | 88.3 | 5 | 83.3 | 5.0 | 3.3 | 86.7 | Acrylic |
| 1 | 1.5 | 20.3 | 13.4 | 3.4 | 41.8 | 86.6 | 10 | 76.6 | 10.0 | 6.6 | 83.4 | Acrylic |
| 1 | 1.5 | 31.0 | 20.1 | 5.1 | 41.8 | 84.9 | 15 | 69.9 | 15.0 | 9.9 | 80.1 | Acrylic |
| 1 | 1.5 | 42.6 | 26.8 | 6.8 | 41.8 | 83.2 | 20 | 63.2 | 20.0 | 13.2 | 76.8 | Acrylic |
| 1 | 1.5 | 56.2 | 33.6 | 8.6 | 41.8 | 81.4 | 25 | 56.4 | 25.0 | 16.4 | 73.6 | Acrylic |
| 1 | 1.5 | 77.1 | 40.5 | 10.5 | 41.8 | 79.5 | 30 | 49.5 | 30.0 | 19.5 | 70.5 | Acrylic |
| 1 | 1.5 | 89.9 | 41.8 | 10.9 | 41.8 | 79.1 | 30.92233 | 48.2 | 30.9 | 20.0 | 70.0 | Acrylic |

At $\theta_5 = 27.035°$ and $\theta_1 = 62.971°$, the primary reflected light ray 606 is completely perpendicular to the optical path 108.

For the table presented above, at $\theta_5 = 0°$, the illumination source 102 and the optical path 108 are on the same axis. In this case, the primary reflected ray 606 will interfere with the secondary refracted ray 610 and a low contrast fingerprint will result. At the other extreme when $\theta_5 = 30.92233°$, the angle at which the light 602 enters the prism is very shallow at approximately 90°. At this angle, very little of the incident light 602 can enter the prism 600, also resulting in a low contrast fingerprint image. As seen in Table 1, there are numerous angles for $\theta_5$ and $\theta_1$ that provide a solution.

Figure 7:
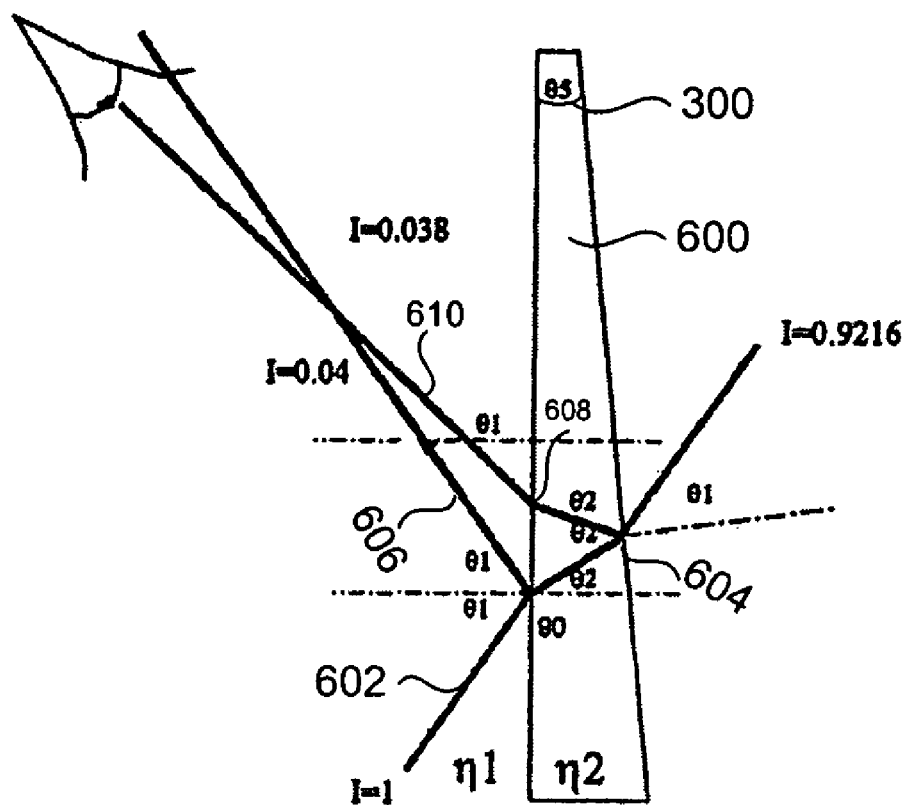
FIG. 7 illustrates the effects of a small prism angle.

FIG. 7 shows the effects of designing a prism 600 with a very small prism angle 300 $\theta_5$. For very small angles of $\theta_5$, the primary reflected ray 606 and the secondary refracted ray 610 are virtually at the same angle and it is therefore hard to distinguish between the two. The result is a low contrast image.

Figure 8:
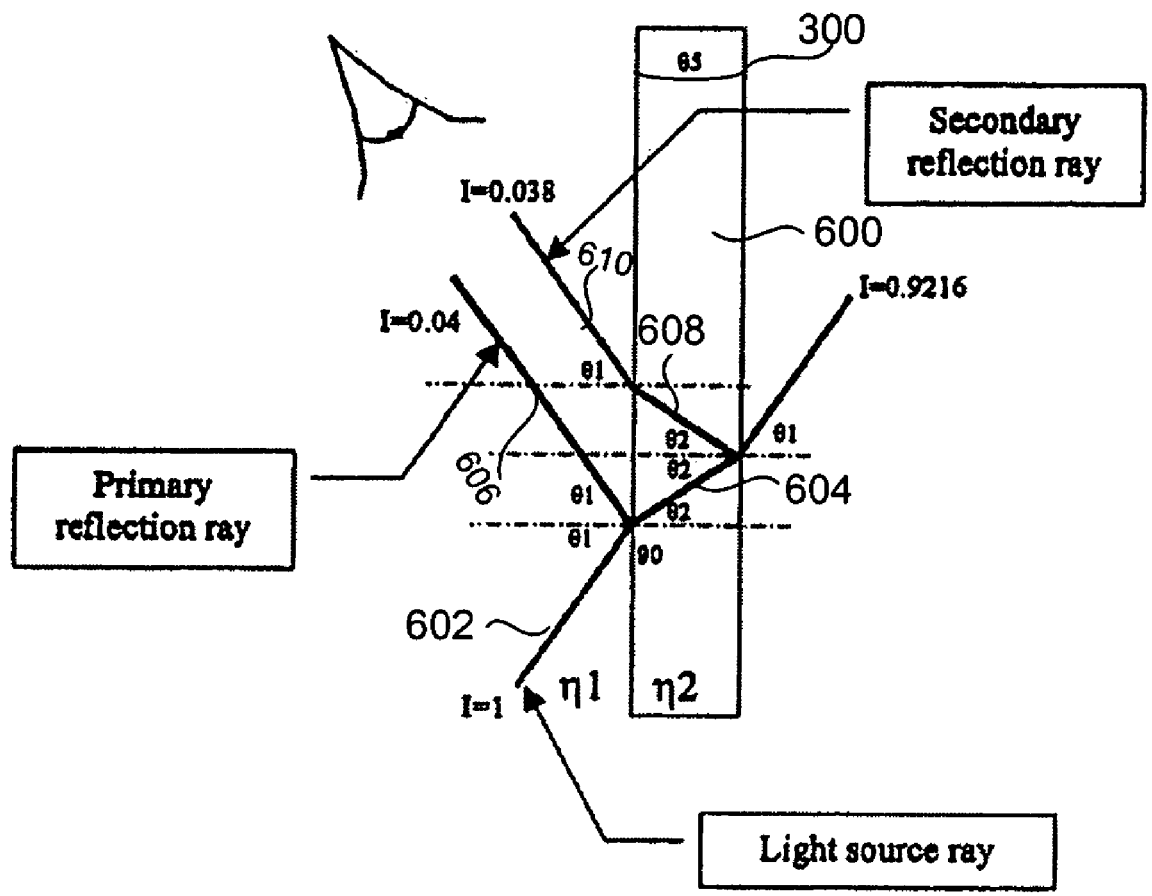
FIG. 8 illustrates the effects of a large prism angle.

FIG. 8 shows the results of designing a prism 600 having a very large prism angle 300 $\theta_5$. As the prism angle 300 $\theta_5$ increases, the primary reflected ray 606 and the secondary refracted ray 610 diverge. Since the angle at which incident light 602 enters is shallow, very little incident light 602 can enter the prism 600, resulting in a low contrast image.

Figure 9:
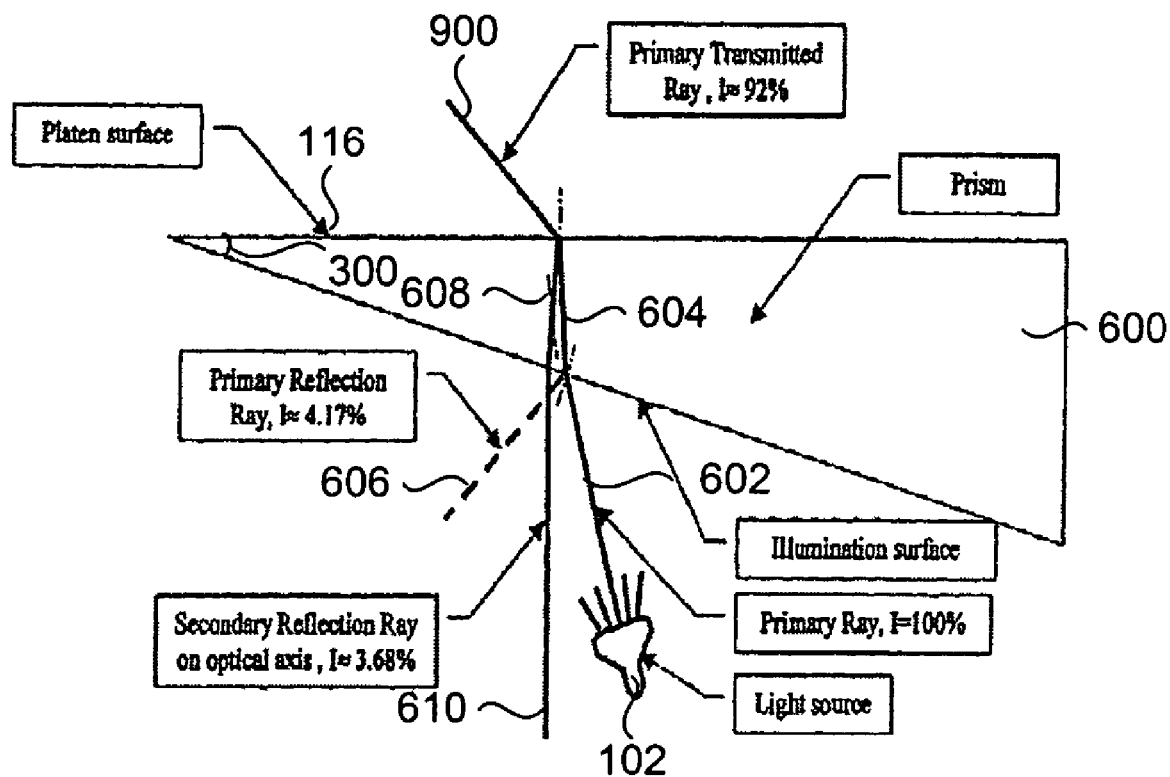
FIG. 9 illustrates the percentage of incident light that is reflected or refracted by a prism.
Figure 10:
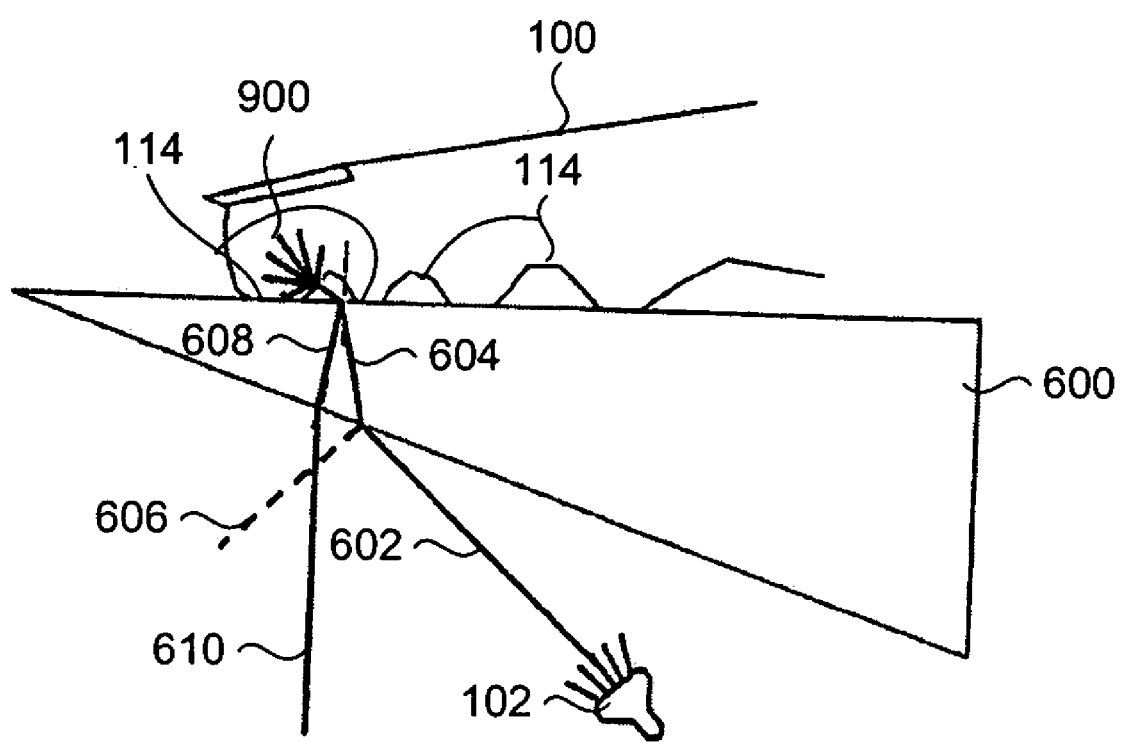
FIG. 10 illustrates the interaction between a fingerprint valley and a primary transmitted ray.
Figure 11:
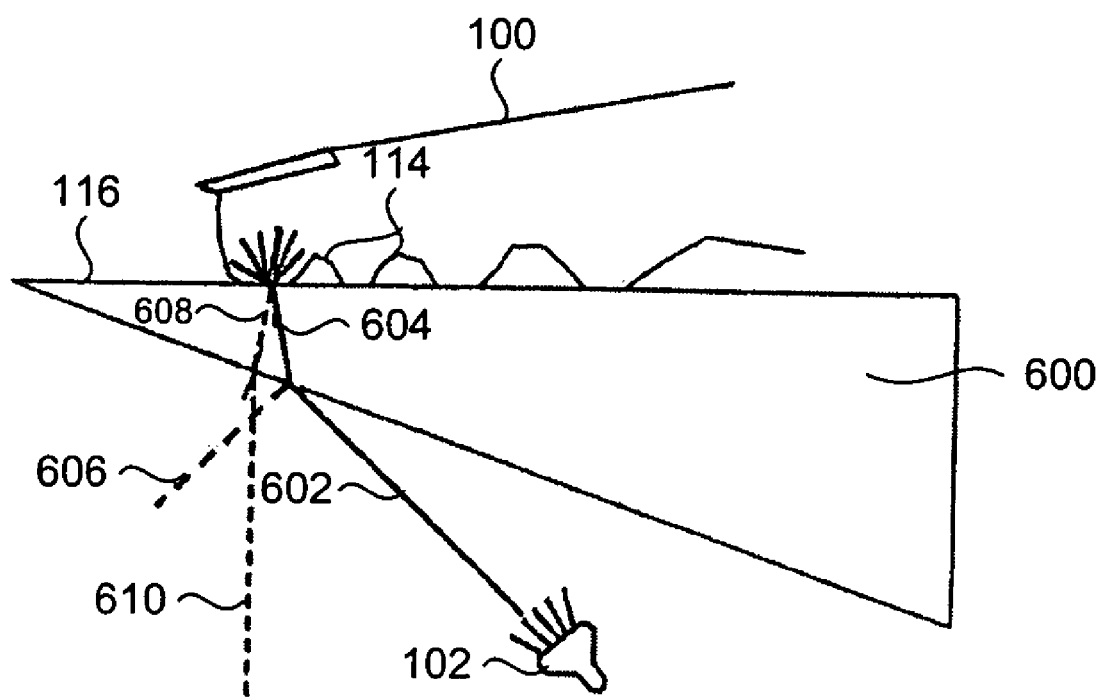
FIG. 11 illustrates the interaction between a fingerprint ridge and a primary transmitted ray.

FIG. 9 shows the percentage of the incident ray 602 that is reflected or refracted by the prism 600. The incident ray 602 exits the illumination source 102 and depending on the angle of incidence $\theta_1$, approximately 96% of the incident ray 602 enters the prism 600 as a primary refracted ray 604 where it is refracted according to Snell's law and the remaining approximately 4% is reflected as the primary reflected ray 606. The primary refracted ray 604 will continue through the prism 600 until it reaches the platen surface 116 where approximately 92% of that light will exit the prism 600 as the primary transmitted ray 900. The remaining 4% will be reflected back towards the illumination surface as secondary reflected ray 608. Once again upon arriving at the illumination surface a very small portion (approximately 0.32%) of the secondary reflected ray 608 will be reflected back into prism 600 and the remaining 3.68% will exit the prism 600 and proceed along optical path 108 as secondary refracted ray 610. Thus 3.68% of the initial incident ray 602 is left to excite the image sensor. This is because outside the critical angle $\theta_3$, only a small portion of the light is reflected and most is dissipated. Because optical axis is perpendicular to platen surface 116 and the prism angle 300 is small, the image will undergo minimum foreshortening. FIG. 10 and FIG. 11 illustrate the interaction between the transmitted ray 900 and fingerprint ridges 112 and valleys 114.

FIG. 10 illustrates contact between the fingerprint valleys 114 and the primary transmitted ray 900. As seen in FIG. 10, on contact with the fingerprint valleys 114 the primary transmitted ray 900 travels outside prism 600 and is absorbed by finger 100 on contact. The primary refracted ray 604 is reflected back as secondary reflected ray 608 which in turn forms the secondary refracted ray 610 upon contact with illumination surface and that will travel to an image sensor/camera.

FIG. 11 illustrates the contact between fingerprint ridges 112 and the primary transmitted ray 900. Due to the fact that the finger 100 epidermis and the prism 600 material have similar refractive index values, the majority of the primary transmitted light 900 at the platen surface 116 will be allowed to enter the finger 100 at the fingerprint ridges 112 where it is actually making contact with the platen surface 116. Upon entering the finger 100, the primary transmitted ray 900 will be both absorbed and diffused but none will be reflected along path 608.

As shown in FIG. 10 and FIG. 11, the difference between the light being absorbed by the finger 100 and that which is reflected back by the platen surface 116 creates the contrast necessary to generate a fingerprint image.

However, as mentioned above, because the secondary refracted ray 610 is only approximately 3.68% of the incident light 602 is left to excite the image sensors, there is a need to improve the contrast of the fingerprint image.

Figure 12:
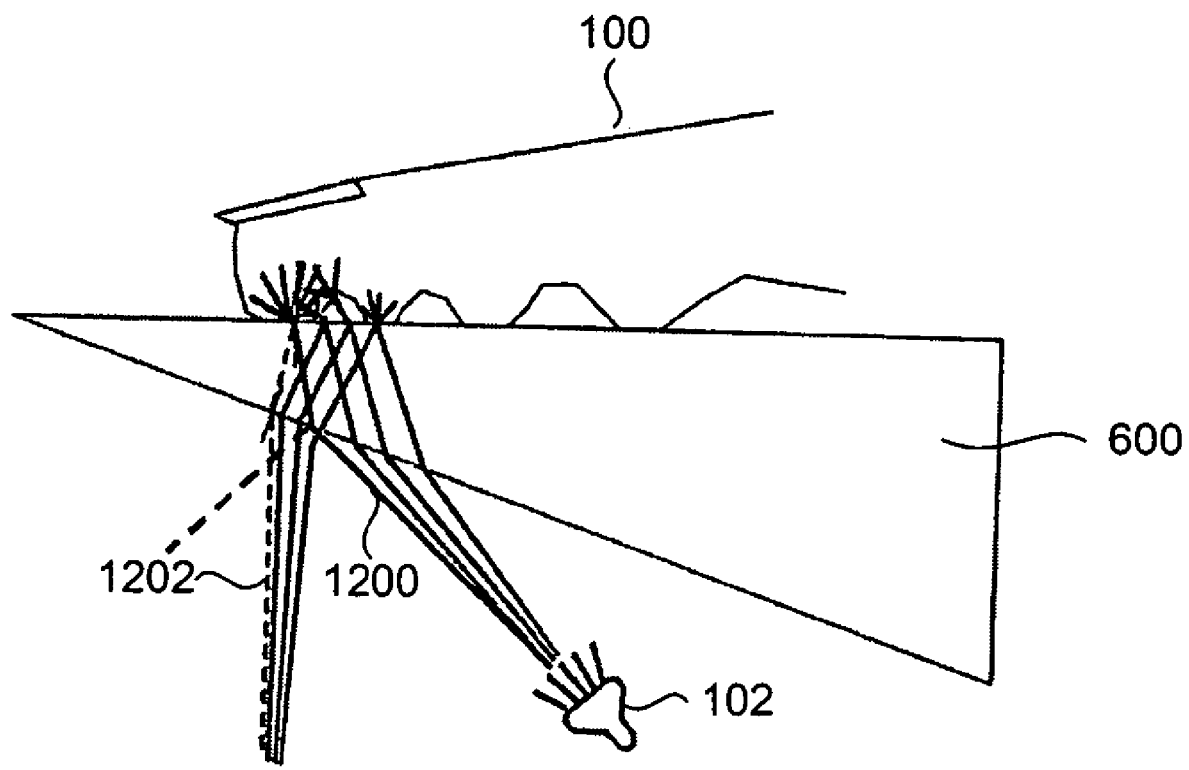
FIG. 12 is an example embodiment with a collimated ray illumination source.

FIG. 12 is an example embodiment where the illumination source 102 generates collimated (parallel) incident rays 1200 for maximum fingerprint contrast when using a thin wedge prism 600. Since collimated incident rays 1200 are parallel, they do not interfere with each other and hence the secondary refracted rays 1202 are also collimated and provide greater contrast.

Figure 13:
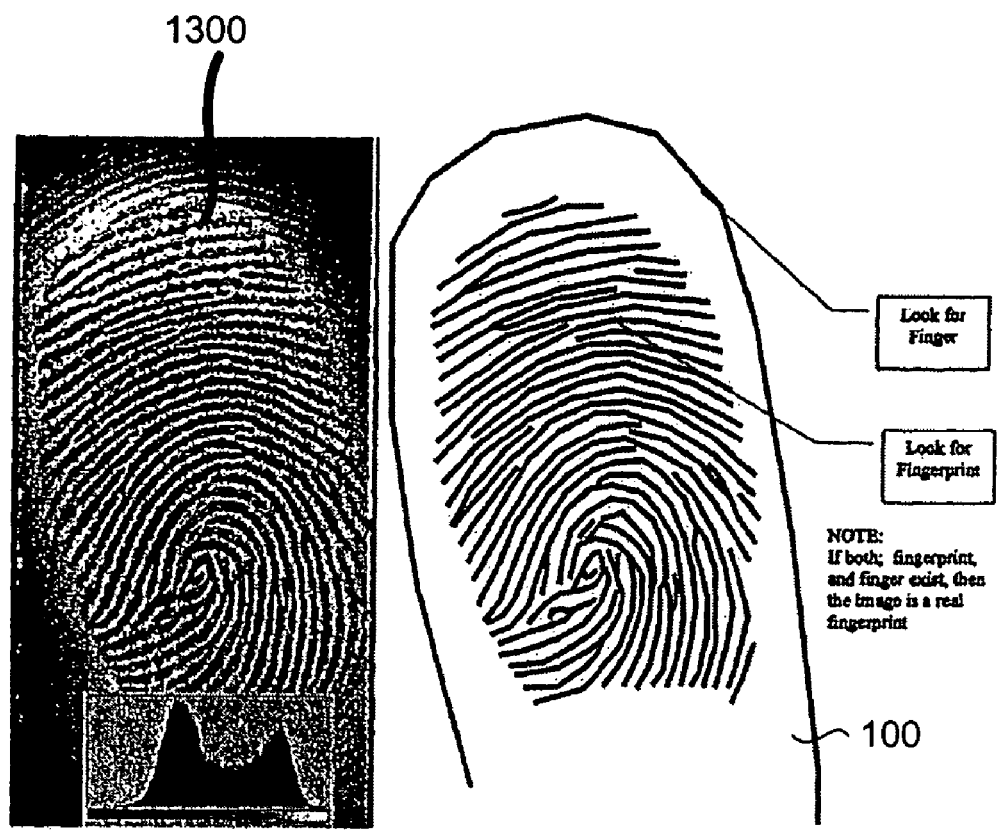
FIG. 13 illustrates a fingerprint image acquired using a non-collimated illumination source.

FIG. 13 illustrates a fingerprint image 1300 acquired using a non-collimated illumination source 102. Non-collimated light rays from the illumination source 102 can adversely affect the fingerprint image 1300. The unwanted rays will be reflected and interfere with the desired fingerprint creating a fingerprint 1300 that includes parts of the finger 100 not in contact with the platen surface 116. However, there are cases where these unwanted rays can be used to image features above the prism platen 116. Fingerprint 1300 shows how the outline of the finger 100 can be seen under certain light conditions. There is still enough fingerprint contrast to generate a high quality fingerprint image 1300. The outline of the finger 100 can be used to help distinguish between real fingerprints and fake fingerprints. If both fingerprint and finger 100 exist then it is a real fingerprint.

Figure 14:
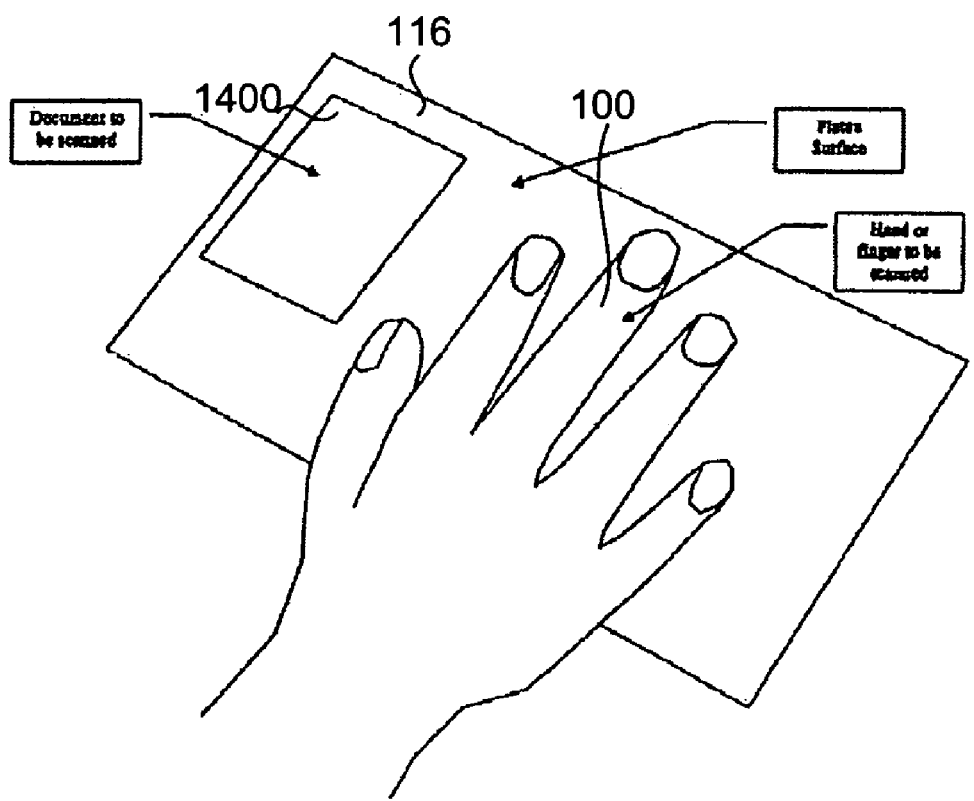
FIG. 14 illustrates an embodiment of a fingerprint and document scanner combination.

In another embodiment shown in FIG. 14, the addition of other light sources can allow other articles such as documents 1400 to be scanned at the same time as the finger 100, fingers or hand on the same platen surface 116. This makes measuring image quality with standard targets easier and provides conformity with standards such as FBI appendix F certification criteria for live scan devices.

Besides the collimated illumination source 102 presented in FIG. 12, other techniques can be used to enhance fingerprint contrast. In another embodiment, reducing the aperture size of the image sensor or camera can increase contrast. In yet another embodiment, contrast can be improved by using a polarized light source and blocking auxiliary reflections from entering the image sensor or camera. In a further embodiment, a short wavelength such as that of blue or green light can be used so that the fingerprint ridges 112 in contact with platen surface 116 absorb most of the incident light thereby creating greater contrast. In yet another embodiment a light source that emits a longer wavelength such as red light can be used to make the finger 100 reflect more light thereby creating greater contrast. In another embodiment a thick plate may be used if the camera and illumination source can move together to create greater contrast.

Figure 15:
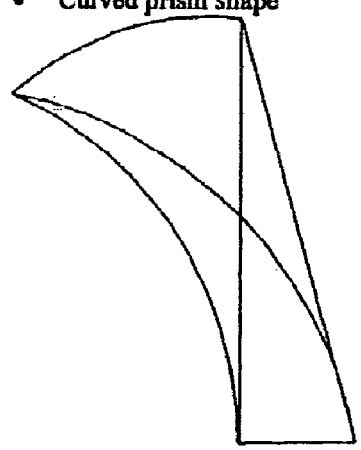
FIG. 15 illustrates example embodiments of curved and cone shaped prisms.
Figure 15:
Figure 15:
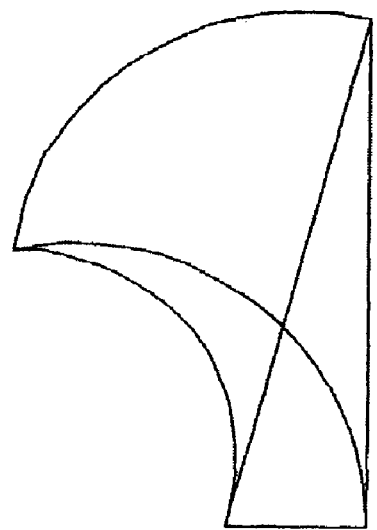
Figure 15:
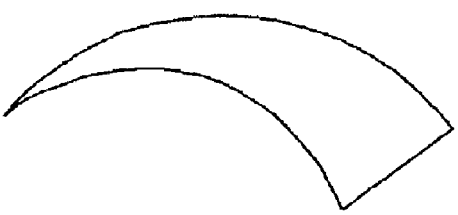
Figure 15:
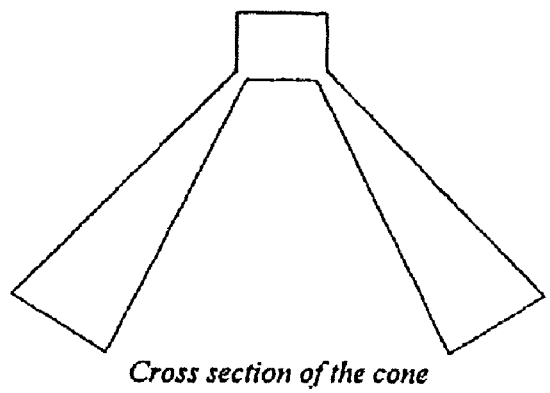

FIG. 15 illustrates example embodiments of curved and cone shaped prisms and a cross section of a cone shaped prism.

Figure 16:
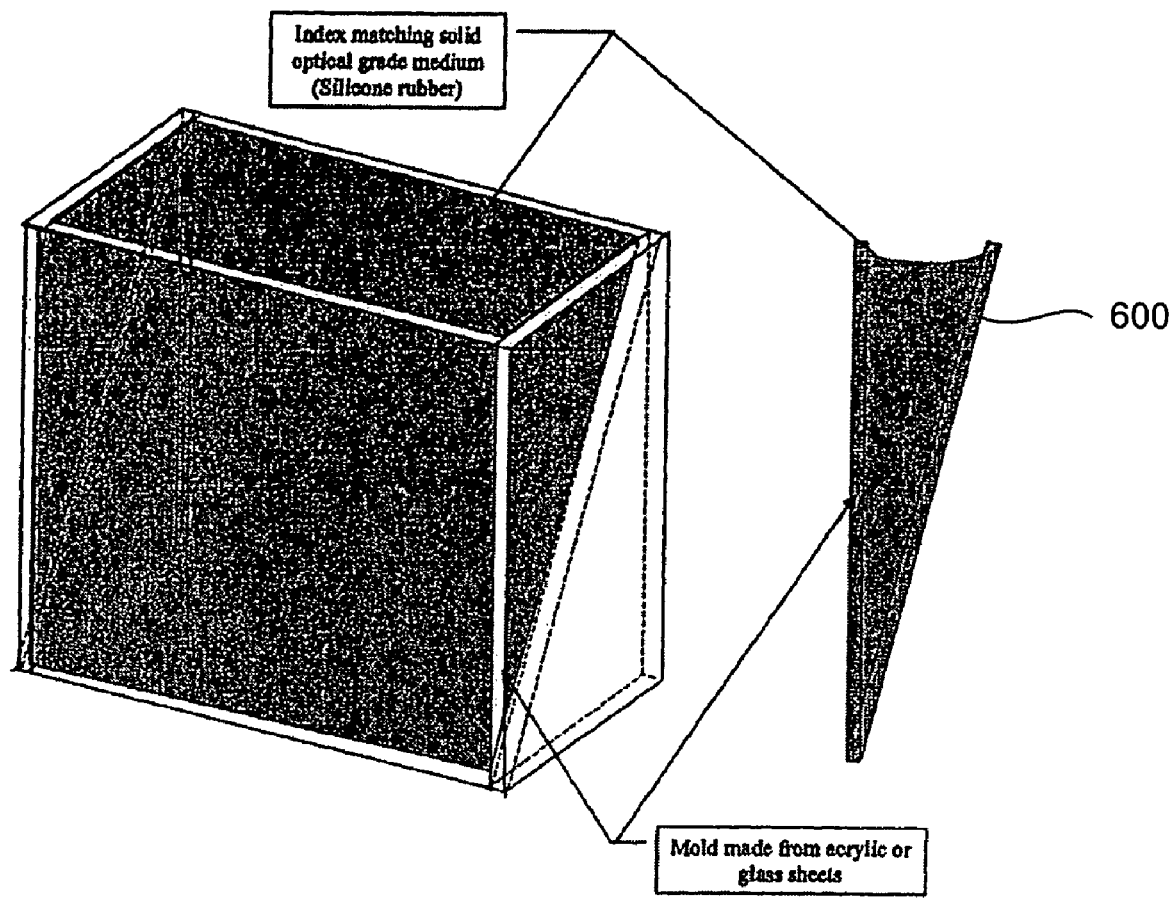
FIG. 16 illustrates a method for manufacturing an example embodiment.
Figure 17:
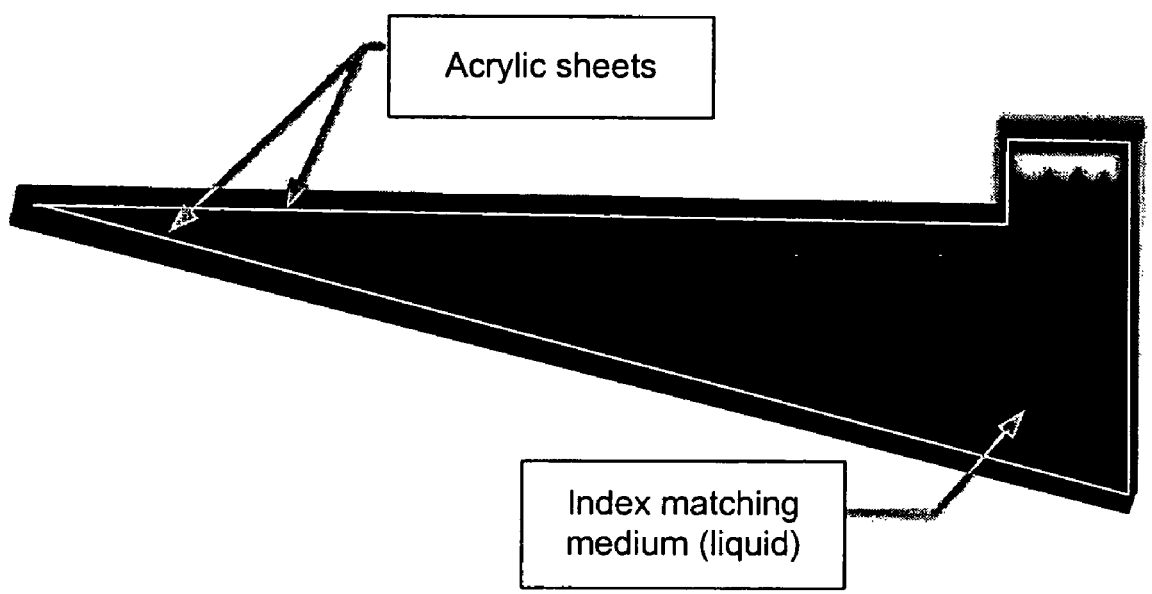
FIG. 17 illustrates another method for manufacturing an example embodiment.

Thin wedge prisms in example embodiments can be manufactured by casting or from a solid piece of material such as glass or acrylic. In one embodiment, a thin wedge prism is manufactured from molded silicone as shown in FIG. 16. In another embodiment a thin wedge prism may be manufactured by filling an acrylic mold wedge reservoir with index matching liquid as shown in FIG. 17.

Figure 18:
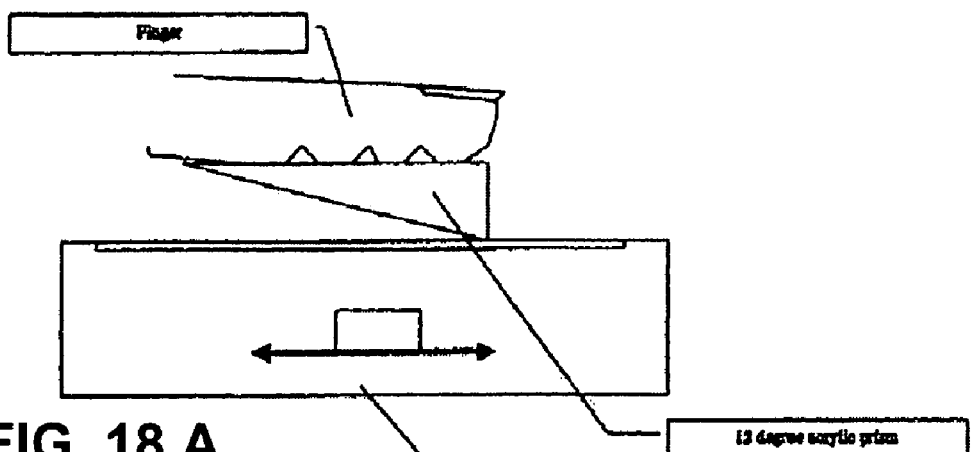
FIGS. 18A and 18B illustrate an embodiment using a standard flat bed scanner.
Figure 18B:
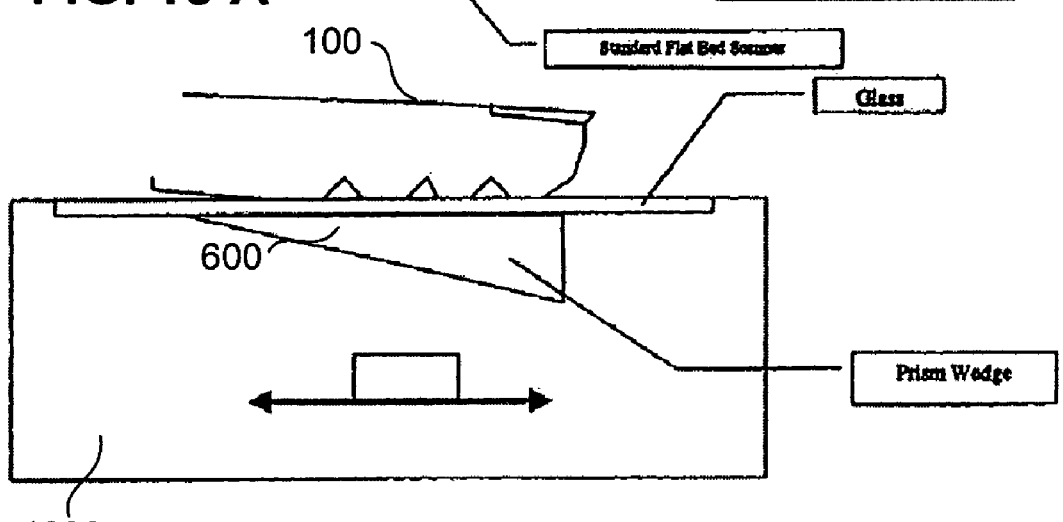

In another embodiment, the thin wedge prism is combined with existing conventional low cost consumer technology such as a flat bed scanner as shown in FIGS. 18A and 18B. As seen in FIG. 18B, a thin prism 600 can be easily accommodated into a standard flatbed scanner 1800. The embodiment presented in FIG. 18B can be used for a variety of services that may need fingerprint scanning along with document scans such as credit cards, drivers licenses, social security cards, birth certificates, job applications and FBI records.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the patent claims and their equivalents.

What is claimed is:

1. A fingerprint surface imaging system to minimize foreshortening of a captured fingerprint image, comprising:
    a thin wedge prism having an illumination surface and a platen surface forming a prism angle $\theta_1$; and
    an illumination source that can emit light onto a fingerprint surface placed on said platen surface of said prism;
    wherein light reflected from the fingerprint surface travels through the thin wedge prism onto the illumination surface and is refracted at the illumination surface onto an image sensor along a direction that is approximately perpendicular to the platen surface.

2. The fingerprint imaging system of claim 1, wherein said illumination source emits collimated incident rays.

3. The fingerprint imaging system of claim 1, wherein said prism is made by filling an acrylic mold wedge reservoir with a liquid.

4. The fingerprint imaging system of claim 1, wherein a primary light ray reflected from said illumination surface is not received by the image sensor.

5. The fingerprint imaging system of claim 1, wherein said illumination source emits non-collimated incident rays.

6. The fingerprint imaging system of claim 1, wherein said illumination source emits polarized rays and auxiliary reflections are blocked from entering the image sensor.

7. The fingerprint imaging system of claim 1, wherein said illumination source emits blue or green light.

8. The fingerprint imaging system of claim 1, wherein said prism comprises glass acrylic material.

9. The fingerprint imaging system of claim 1, wherein the image sensor comprises a camera.

10. A fingerprint surface imaging system to minimize foreshortening of a captured fingerprint image, comprising:
    a thin wedge prism having an illumination surface and a platen surface forming a prism angle $\theta_1$; and
    an illumination source that can emit light onto a fingerprint surface placed on said platen surface of said prism;
    wherein light reflected from the fingerprint surface travels through the thin wedge prism onto the illumination surface and is refracted at the illumination surface onto an image sensor along a direction that is approximately perpendicular to the platen surface, and
    wherein an angle of incidence of light emitted by said illumination source onto said illumination surface is a function of, at least in part, a refractive index of said prism and said prism angle $\theta_1$.

11. A method, comprising:
    directing, by an illumination source, a light onto a fingerprint surface placed on a platen surface of a thin wedge prism; and
    receiving, by an imaging sensor, the directed light after being reflected from the fingerprint surface and being refracted at an illumination surface of the thin wedge prism along a direction that is approximately perpendicular to the platen surface.

12. The method of claim 11, wherein an angle of incidence of light emitted by said illumination source onto said illumination surface is a function of, at least in part, a refractive index of said prism and said prism angle $\theta_1$.

13. The method of claim 11, wherein said illumination source emits collimated incident rays.

14. The method of claim 11, wherein said prism is made by filling an acrylic mold wedge reservoir with a liquid.

15. The method of claim 11, wherein a primary light ray reflected from said illumination surface is not received by the image sensor.

16. The method of claim 11, wherein said illumination source emits non-collimated incident rays.

17. The method of claim 11, wherein said illumination source emits polarized rays and auxiliary reflections are blocked from entering the image sensor.

18. The method of claim 11, wherein said illumination source emits blue or green light.

19. The method of claim 11, wherein said prism comprises glass acrylic material.

20. The method of claim 11, wherein the image sensor comprises a camera.

* * * * *